United States Patent [19]

Rossigno et al.

[11] Patent Number: 5,136,927
[45] Date of Patent: Aug. 11, 1992

[54] ADJUSTMENT MEANS FOR A REACTION MEMBER

[75] Inventors: Louis P. Rossigno, Granger, Ind.; Jon R. Dodson, Niles, Mich.

[73] Assignee: Allied-Signal Inc., Morristown, N.J.

[21] Appl. No.: 620,979

[22] Filed: Nov. 30, 1990

[51] Int. Cl.⁵ ............................................. F15B 9/10
[52] U.S. Cl. ................................. 91/369.2; 91/376 R
[58] Field of Search ............... 91/369.1, 369.2, 376 R; 92/84

[56] References Cited

U.S. PATENT DOCUMENTS

| 4,757,748 | 7/1988 | Kawasomi et al. | 92/84 |
| 4,984,506 | 1/1991 | Perez | 91/369.2 |

FOREIGN PATENT DOCUMENTS

| 0004477 | 10/1979 | European Pat. Off. | |
| 0340059 | 11/1989 | European Pat. Off. | |
| 3518399 | 11/1985 | Fed. Rep. of Germany | 91/369.2 |
| 1560915 | 3/1969 | France | |
| 0183342 | 10/1983 | Japan | 91/369.2 |
| 0202146 | 11/1983 | Japan | 91/369.2 |

*Primary Examiner*—Edward K. Look
*Assistant Examiner*—Hoang Nguyen
*Attorney, Agent, or Firm*—Leo H. McCormick, Jr.; Ken C. Decker

[57] ABSTRACT

An adjustment member having an end cap with threads thereon that match threads on the hub of a movable wall in a vacuum brake booster. The end cap has a plurality of projections located on its peripheral which allow a tool to rotate the end cap with respect to the hub and establish a space relationship between the hub and plunger to define a gap between said plunger and resilient member. The gap delaying the engagement of the resilient member and plunger until after a predetermined output force develops across the wall. The end cap has a central opening through which the reaction disc is thereafter communicated to oppose movement of the plunger by an operator input force during a brake application.

5 Claims, 2 Drawing Sheets

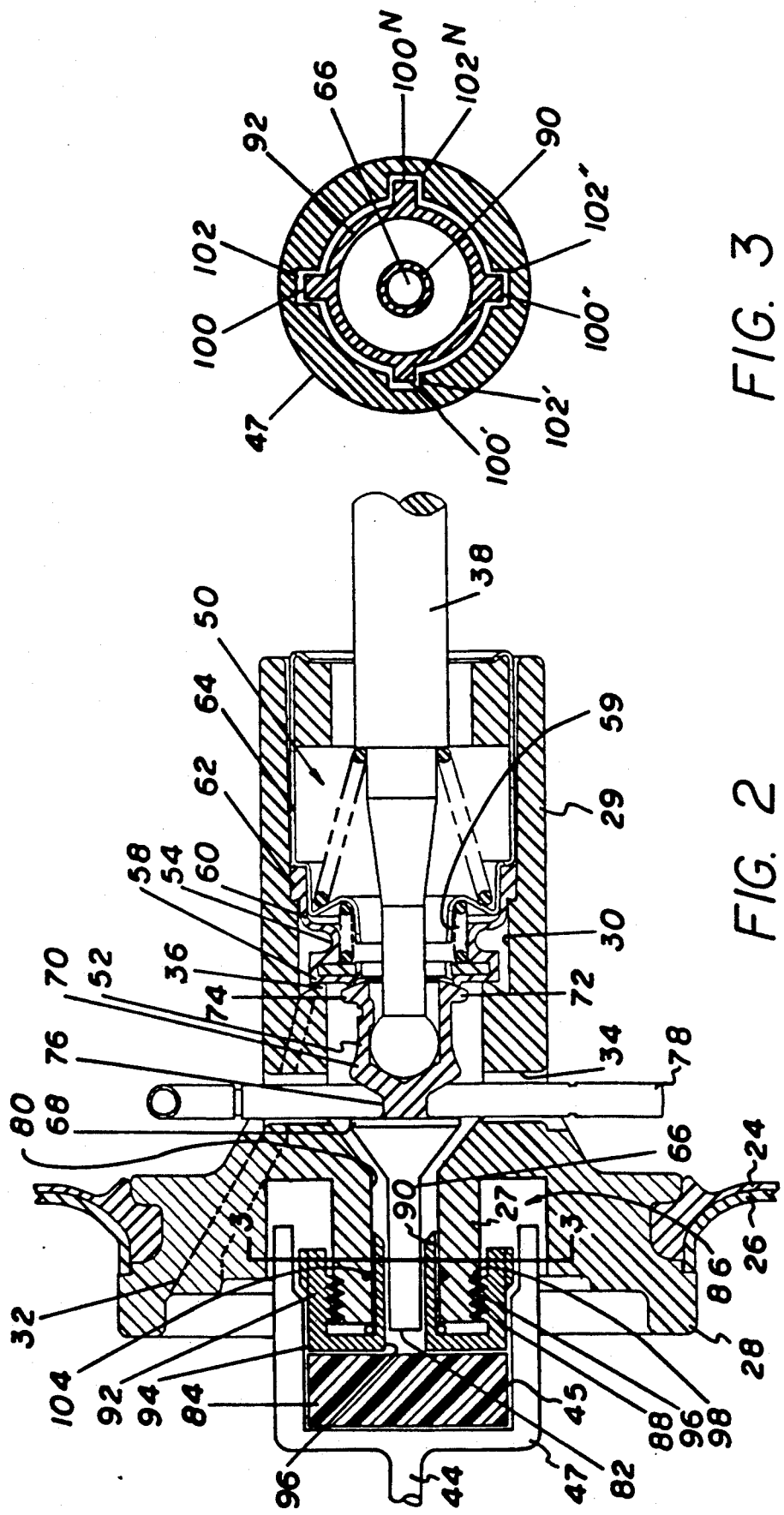

ADJUSTMENT MEANS FOR A REACTION MEMBER

This invention relates to an adjustment structure for establishing the space relationship between a reaction disc and a plunger in a brake booster to delay the communication of a reaction force to an input member until a predetermined output force is produced in the booster and supplied to a master cylinder.

Heretofore, it was common practice to provide an output rod of a vacuum brake booster with a threaded end section which received a screw to adjust the linkage between a booster and a master cylinder. The screw was rotated on the threaded end section before the vacuum brake booster was coupled to the master cylinder to establish the linkage between a piston in the master cylinder and the movable wall in the brake booster. When the vacuum brake booster was coupled to the master cylinder the linkage is critical to assure that movement of the movable wall as transmitted through the output rod results in a corresponding movement of the piston. The vacuum brake booster and master cylinder disclosed in U.S. Pat. No. 3,724,211 (Julow), issued Apr. 3, 1973 illustrated a typical combination wherein the adjustment of the screw on output rod of the booster requires a calibration to occur before the master cylinder is coupled to a vacuum brake booster. This calibration adjustment is necessary for the optimum relationship between a brake booster and master cylinder and takes into consideration manufacturing tolerances.

U.S. Pat. 4,493,742 discloses one method to reduce the time and effort required to calibrate and establish the linkage between a brake booster and master cylinder. In this method the calibration is modified through the use of a bonding material that fixes the length of the output push rod after the brake booster and master cylinder are joined together.

U.S. Pat. 4,953,446 discloses the importance in reducing the time involved in effecting a brake application. In this brake booster, the valve structure is positioned to initiate the development of an output force when an operator initiates movement of a brake pedal.

The present invention represent structural components which adjusts the space relationship between a reaction disc and the plunger of a control valve to delay the reaction forces communicated to the input member until a predetermined resistive force develops in the master cylinder to assure that the pistons in the master cylinder are in a position to pressurize fluid in response to an operator input force. In this brake booster, the hub has a bore for retaining a plunger of the control valve. The hub is attached to the movable wall that separates the interior of front and rear shells of the brake booster into first and second chambers. The plunger moves in response to an actuation force from an input member by initially moving from a lap position where the first and second chambers are isolated from each other to an actuation position where the second chamber is connected to a source of fluid under pressure to develop a pressure differential across the movable wall. The pressure differential acts on the wall to transmit an output force through a resilient member to an output member. A opening in a sleeve located between the reaction disc and plunger controls the extrusion of the reaction disc caused by opposition of the input force until a predetermined output force develops across the wall. The sleeve has end cap with threads that match threads on the hub to establish the space relationship between the plunger and reaction disc to assure that the piston in the master cylinder is in a position to create pressurized fluid and effect a brake application before reaction forces are communicated to oppose the input force.

An advantage of this invention resides in structure which permits the external adjustment of the internal space relationship of the linkage between a brake booster and a master cylinder in order to match the linear movement of an input member to the brake booster with the movement of a piston in the master cylinder.

It is an object of this invention to provide a vacuum brake booster with an internal adjustment for delaying the transmission of a reaction force from an output member to an input member until after the development of pressurized fluid in the master cylinder.

These objects and advantage should be apparent from reading this specification while viewing the drawings wherein:

FIG. 2 is an enlarged view of the adjustment structure of FIG. 1; and

FIG. 3 is a sectional view taken along line 3-3 of FIG. 2.

Figure 1:
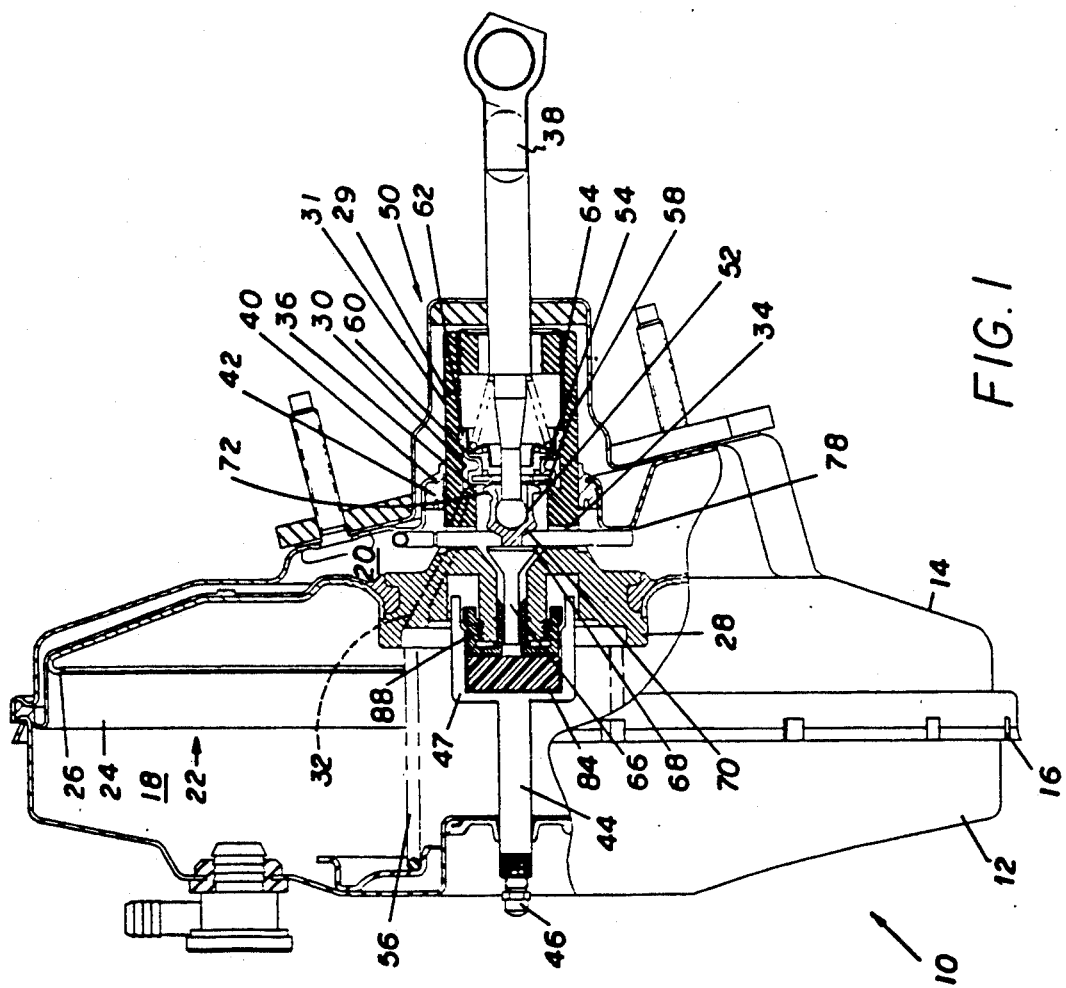
FIG. 1 is a sectional view of a brake booster having an adjustment structure for establishing the space relationship of a reaction disc and plunger in accordance with the principals of this invention.

The brake booster 10 shown in FIG. 1 is designed to be connected to a master cylinder in a brake system to assist in supplying an input force required to operate the master cylinder and effect a brake application. The brake booster 10 is designed to be quite, efficient and respond immediately to supply an operational force to the master cylinder in response to an operator input force.

The servomotor 10 has a front shell 12 joined to a rear shell 14 by a series of lances and tabs 16 to form a closed housing. The interior of the closed housing is divided by a movable wall 22, which includes a diaphragm 24, backing plate 26 and a hub 28, into a front chamber 18 and a rear chamber 20. Hub 28 has a cylindrical body 29 with a stepped bore 30 that extends therethrough. Bore 30 is connected to chamber 18 by passage 32, shown by dashed lines, and to chamber 20 by slot or passage 34. An annular vacuum seat 36 is located between passages 32 and 34. The cylindrical body 29 which extends through an opening 40 in the rear shell 14 connects bore 30 to the surrounding environment. A seal 42 of the type disclosed in U.S. Pat. No. 4,898,081 is located between opening 40 and the exterior surface 31 on the cylindrical projection 29 to seal chamber 20 from the surrounding environment.

An output push rod 44 connected to hub 28 extends through shell 12 for providing a piston in a master cylinder (not shown) with an operational force corresponding to an input force applied to a brake pedal connected to push rod 38 of the control valve 50.

The control valve 50 as best shown in FIG. 2, includes a plunger 52 and a poppet member 54 controls the communication of air from the environment through bore 30 to chamber 20, the evacuation of air from chamber 20 to chamber 18 to equalize the pressure in chambers 18 and 20. In the rest position shown in FIG. 1 where chambers 18 and 20 are isolated from each other in anticipation of an input force from an operation to effect a brake application.

The poppet member 54 has a face 58 connected by a flexible member 60 to a bead 62 fixed to the cylindrical body 29 by a retainer 64.

The plunger 52 has a cylindrical body with a first diameter 66, a second diameter 68, a third diameter 70 and a head 72 with a spherical face or seat 74. A slot 76 located in the cylindrical body receives a key member 78 of the type disclosed in U.S. Pat. No. 4,953,446 for retaining the plunger 50 in bore 30. Diameter 66 of plunger 50 which extends through axial opening 80 in hub 28 has a face 82 that is located adjacent reaction disc 84. Reaction disc 84 is located in bore 45 in head 47 on output push rod 44. The space relationship between face 82 and reaction disc 84 is controlled by adjustment means 86.

Adjustment means 86, which forms an end cap on annular projection 27 of hub 28, has a cylindrical body 88 with a concentric inner and outer ribs or annular projections 90 and 92 that extend from a base 94. Base 94 has an axial opening 96 through which reaction disc 84 is communicated to face 82. Rib 90 has an outer surface that engages seal 104 in bore 80 on hub 28 and inner surface which form a guide surface for the first diameter 66 of plunger 50. Rib 92 has threads 96 on its inner surface which are matched with threads 98 on projection 27 and an outer surface which has a series or plurality of rectangular projections 100, 100'. . . 100$^n$ that are located in slots 102, 102'. . . 102$^n$ in head 47 of the output push rod 44. The O-ring seal 104 located between rib 90 and projection 27 prevents communication from bore 30 to the chamber 18 once threads 96 are screwed onto projection 27.

After the brake booster 10 is assembled, its operational parameters such as speed, output force, vacuum leaks, etc. are checked in various test fixtures. As disclosed in U.S. Pat. No. 4,953,446 and shown in FIG. 1, when the brake booster 10 is in the rest position, key 78 and return spring 59 positions plunger 52 in a lap position where face 58 on poppet 52 is seated both on vacuum seat 36 and spherical seat 74 on head 72 to interrupt communication between chambers 18 and 20 through bore 30. When an operator desires to effect a brake application, air from the environment is the pressurized fluid or power source used to develop a pressure differential across wall 22 in response to an input force applied to push rod 38 by a brake pedal. The input force moves spherical face 74 on head 72 of plunger 50 away from face 58 to allow air from the environment to flow to chamber 20 through bore 30 by way of slot 34. With air in chamber 20 and vacuum in chamber 18, a pressure differential is created across wall 22 that creates a force which is transferred into hub 28. The force from hub 28 is carried through reaction disc 84 to head 47 to provide an output force for push rod 44. When the resistance to movement of the output push rod 44 reaches a predetermined value, a portion of reaction disc 84 is extruded into axial opening 96 and engages face 82 on plunger 52 to oppose the input force applied by the operator. With the servomotor 10 in the test fixture, a rotative torque may be applied to nut 46 on push rod 44 to adjust the space relationship between base 94 and face 82 and establish the distance that the reaction disc 84 must be extruded into opening 96 before engaging face 82 on plunger 52. For a given brake booster 10 which is to be matched with a master cylinder, the space relationship or gap between reaction disc 84 and face 82 determines the distance that the output rod 44 moves before providing a reaction force to oppose the input force.

We claim:

1. In a brake booster having a hub with a bore for retaining a plunger of a control valve, said hub being attached to a movable wall that separates the interior of front and rear shells of the brake booster into first and second chambers, said plunger responding to an actuation force from an input member by initially moving from a lap position where the first and second chambers are isolated from each other to an actuation position where the second chamber is connected to a source of fluid under pressure to develop a pressure differential across the movable wall, said pressure differential acting on said wall to transmit an output force through a resilient member to an output member, said resilient member engaging said plunger to provide a reaction force to oppose the input force, the improvement comprising:

adjustment means having an end cap with threads thereon that match threads on the hub, said end cap having a plurality of projections located on an external surface, said projections allowing a tool to rotate said end cap with respect to said hub to establish a space relationship between said hub and plunger to define a gap between said plunger and resilient member, said gap delaying the engagement of said resilient member and plunger until after a predetermined output force develops to extrude a portion of said resilient member through a central opening in said end cap to thereafter oppose said input force.

2. In the brake booster as recited in claim 1 wherein said adjustment means further includes:

seal means located between said end cap and said hub to prevent communication of said source of fluid under pressure to said first chamber.

3. In the brake booster as recited in claim 2 wherein said output member includes:

a push rod having a cylindrical head with a bore therein, said bore having a plurality of axial slots, said plurality of projections on said end cap being located in said axial slots, said push rod being rotated to adjust said space relationship as a function of movement of the output by said wall.

4. In the brake booster as recited in claim 3 wherein said resilient member is retained in said bore of said cylindrical head.

5. In the brake booster as recited in claim 1 wherein said adjustment means includes:

a sleeve extending from said end cap for providing an axial movable bearing surface for said plunger.

* * * * *